(12) United States Patent
Neubacher et al.

(10) Patent No.: US 9,274,746 B2
(45) Date of Patent: Mar. 1, 2016

(54) LATENCY HIDING TECHNIQUES FOR MULTI-MODAL USER INTERFACES

(75) Inventors: Andreas Neubacher, Vienna (AT); Miklós Pápai, Budapest (HU); Attila Muszta, Budapest (HU); Herwig Häle, Traiskirchen (AT); Christina Drexel, Vienna (AT)

(73) Assignee: Nuance Communications, Inc., Burlington, MA (US)

( * ) Notice: Subject to any disclaimer, the term of this patent is extended or adjusted under 35 U.S.C. 154(b) by 1127 days.

(21) Appl. No.: 13/030,161

(22) Filed: Feb. 18, 2011

(65) Prior Publication Data
US 2012/0216134 A1    Aug. 23, 2012

(51) Int. Cl.
*G10L 15/26* (2006.01)
*G06F 3/16* (2006.01)
*G06F 3/038* (2013.01)

(52) U.S. Cl.
CPC ............... *G06F 3/167* (2013.01); *G06F 3/038* (2013.01); *G06F 3/16* (2013.01); *G10L 15/26* (2013.01); *G10L 15/265* (2013.01)

(58) Field of Classification Search
CPC ......... G10L 14/26; G10L 15/285; G06F 3/16; G06F 3/167; G06F 3/038
USPC ....................................................... 715/728
See application file for complete search history.

(56) References Cited

U.S. PATENT DOCUMENTS

| | | | |
|---|---|---|---|
| 6,292,857 B1 * | 9/2001 | Sidoroff et al. | 710/54 |
| 6,538,667 B1 * | 3/2003 | Duursma et al. | 715/740 |
| 2003/0225825 A1 * | 12/2003 | Healey et al. | 709/203 |
| 2009/0216531 A1 * | 8/2009 | Yanagihara | 704/235 |

* cited by examiner

*Primary Examiner* — Aaron Lowenberger
(74) *Attorney, Agent, or Firm* — Wolf, Greenfield & Sacks, P.C.

(57) ABSTRACT

A multi-modal user interface is described that hides response latency delays. A graphical user interface (GUI) supports different user input modalities including low delay inputs which respond to user inputs without significant delay, and high latency inputs which have a significant response latency after receiving a user input before providing a corresponding completed response. The GUI accepts user inputs in a sequence of mixed input modalities independently of response latencies without waiting for responses to high latency inputs, and responds to each user input in the sequence as if each preceding user input in the sequence had been performed without response latencies.

18 Claims, 4 Drawing Sheets

Fig. 1

LATENCY HIDING TECHNIQUES FOR MULTI-MODAL USER INTERFACES

TECHNICAL FIELD

The present invention relates to computer systems with multi-modal user inputs and high response latencies.

BACKGROUND ART

Multi-modal user input systems support multiple different user input modalities with different response delays, even though user interaction occurs in real time and response delays are undesirable. Low delay inputs such as keyboard, mouse, pointing device, touch screen etc. respond to user inputs without significant delay. On the other hand, high latency inputs have a significant response latency after receiving a user input before providing a corresponding completed response.

For example, high latency inputs such as an automatic speech recognition input reflect a response latency that is inherent in the speech recognition process which requires some significant amount of audio (corresponding to several words) before being able to produce recognition text that matches the input speech with high degree of probability. In addition, a user input may also be associated with a remote server having a response latency that reflects data transfer delays occurring over a computer network. For example, a speech recognition process may need to send the input speech audio over a computer network to a remote server where the speech recognition engine resides, and the corresponding recognition text output may need to be sent back to the local client that displays the user interface to the user. The responsiveness of a multi-modal user input system is usually controlled by the input with the highest response latency.

The effects of response latencies can be minimized to some degree, but they cannot be entirely eliminated due to algorithmic limitations in the speech recognition process and physical limitations on computer network speed. Still, it is very desirable to minimize the effects of response latencies for the user.

In a real time speech recognition arrangement, the user effects associated with response latencies are two-fold. First, the user has no clear picture of the current state of the system. If an utterance has been spoken, but the recognized text has not yet appeared on the user interface, the system presents an undefined state to the user. For all the user knows, the system may have failed to record the audio, the network connection may have been interrupted in a server-based speech recognition system, the speech recognition engine may have failed to produce output text, or there may be a delay and results may be produced eventually.

In addition, the user speaker cannot continue with workflow tasks until the results from the pending input utterance have been completely processed and the user interface has been updated. For example, if a user has dictated text for a specific location in a document or form, and wants to dictate more additional text at a different location or form field, this is usually not possible until the recognition text from the first dictation has been inserted into the document.

In some cases, the waiting time caused by response latency simply must be accepted. For example, if the speaker dictates into a search field and wants to act on the search results, no action is possible until the results have been presented. On the other hand, maximizing the duration of a single workflow task can minimize some response latency effects. For example, response latency effects are reduced if the user can dictate a long document in one extended passage rather than waiting for each individual sentence to be displayed before dictating the next sentence. This suggests a "batch processing" work style that may not be desirable in highly interactive multi-modal applications that allow a mix of latency-encumbered input modes such as speech recognition, and low delay input modes that can be processed immediately in real time such as touch, mouse, or keyboard input.

SUMMARY

Embodiments of the present invention are directed to a multi-modal user interface that hides response latency delays. A graphical user interface (GUI) supports different user input modalities including low delay inputs which respond to user inputs without significant delay, and high latency inputs which have a significant response latency after receiving a user input before providing a corresponding completed response. The GUI accepts user inputs in a sequence of mixed input modalities independently of response latencies without waiting for responses to high latency inputs, and responds to each user input in the sequence as if each preceding user input in the sequence had been performed without response latencies.

The high latency inputs may include an automatic speech recognition input having a response latency reflecting speech recognition processing. In addition or alternatively, a high latency input may include an input associated with a remote server having a response latency reflecting data transfer delays occurring over a computer network. There may be a merge process that provides completed responses to the GUI after the response latency according to deterministic rules. Operation of the GUI may include use of a data model process for managing the sequence of user inputs. The data model process may run on a remote server, and/or perform user inputs in the sequence in a correct time sequence order.

Embodiments of the present invention also include a corresponding method of operating multi-modal user interface. A graphical user interface (GUI) is provided that supports different user input modalities including low delay inputs which respond to user inputs without significant delay, and high latency inputs which have a significant response latency after receiving a user input before providing a corresponding completed response. User inputs to GUI elements are accepted in a sequence of mixed input modalities independently of response latencies without waiting for responses to high latency inputs. Each user input in the sequence is responded to as if each preceding user input in the sequence had been performed without response latencies.

In further specific such embodiments, the high latency inputs may include an automatic speech recognition input having a response latency reflecting speech recognition processing. In addition or alternatively, a high latency input may include an input associated with a remote server having a response latency reflecting data transfer delays occurring over a computer network. There may be a merge process that provides completed responses to the GUI after the response latency according to deterministic rules. Operation of the GUI may include use of a data model process for managing the sequence of user inputs. The data model process may run on a remote server, and/or perform user inputs in the sequence in a correct time sequence order.

BRIEF DESCRIPTION OF THE DRAWINGS

FIG. 1 shows an example of a mixed latency multi-modal graphical user interface (GUI) according to one embodiment of the present invention.

DETAILED DESCRIPTION

Figure 2:
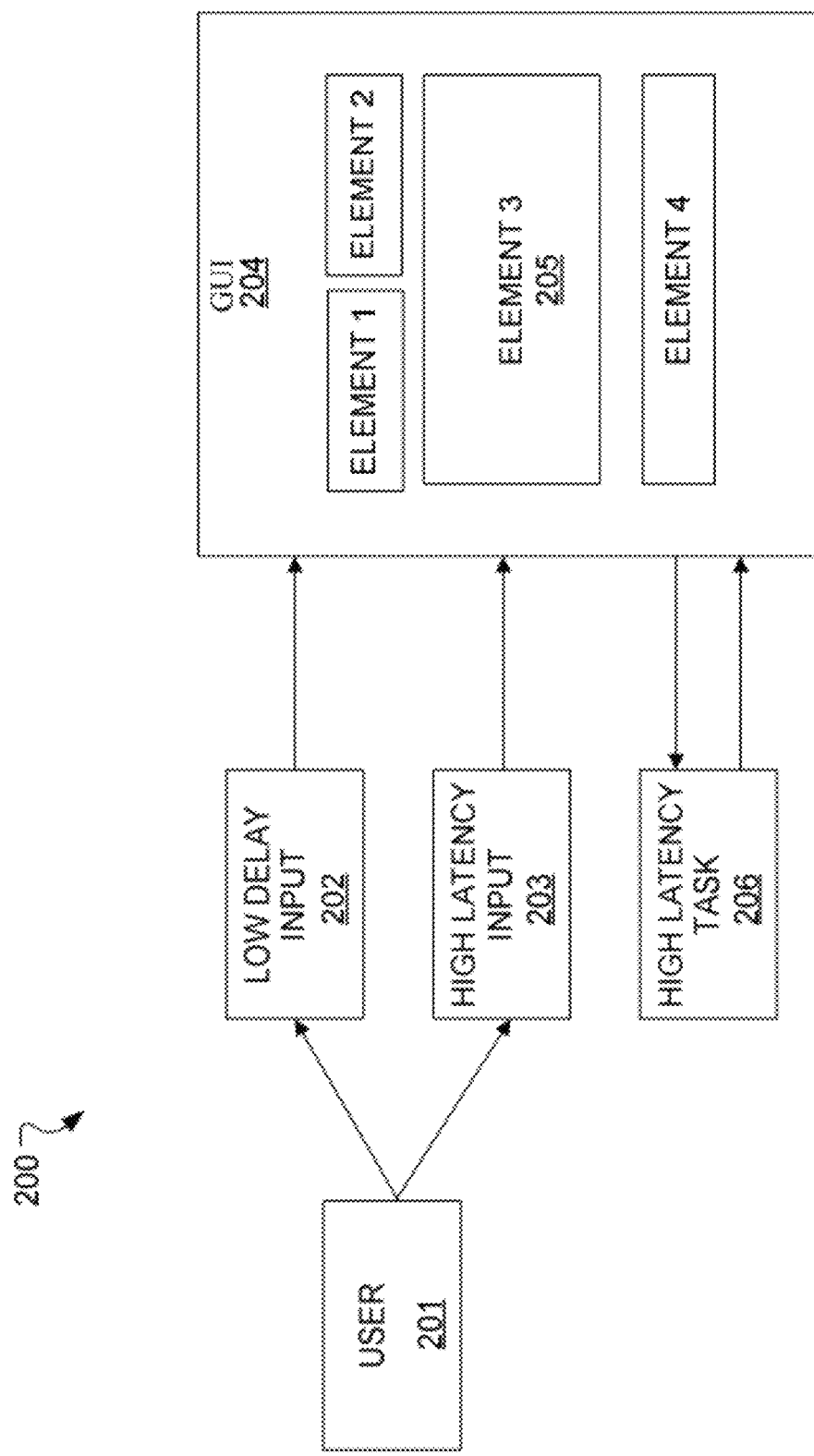
FIG. 2 shows various functional blocks in a multi-modal GUI system according to an embodiment of the present invention.

In one aspect, embodiments of the present invention minimize the effects of response latencies in multi-modal user input systems with increased responsiveness to the user as well as valuable user feedback.

Figure 1:
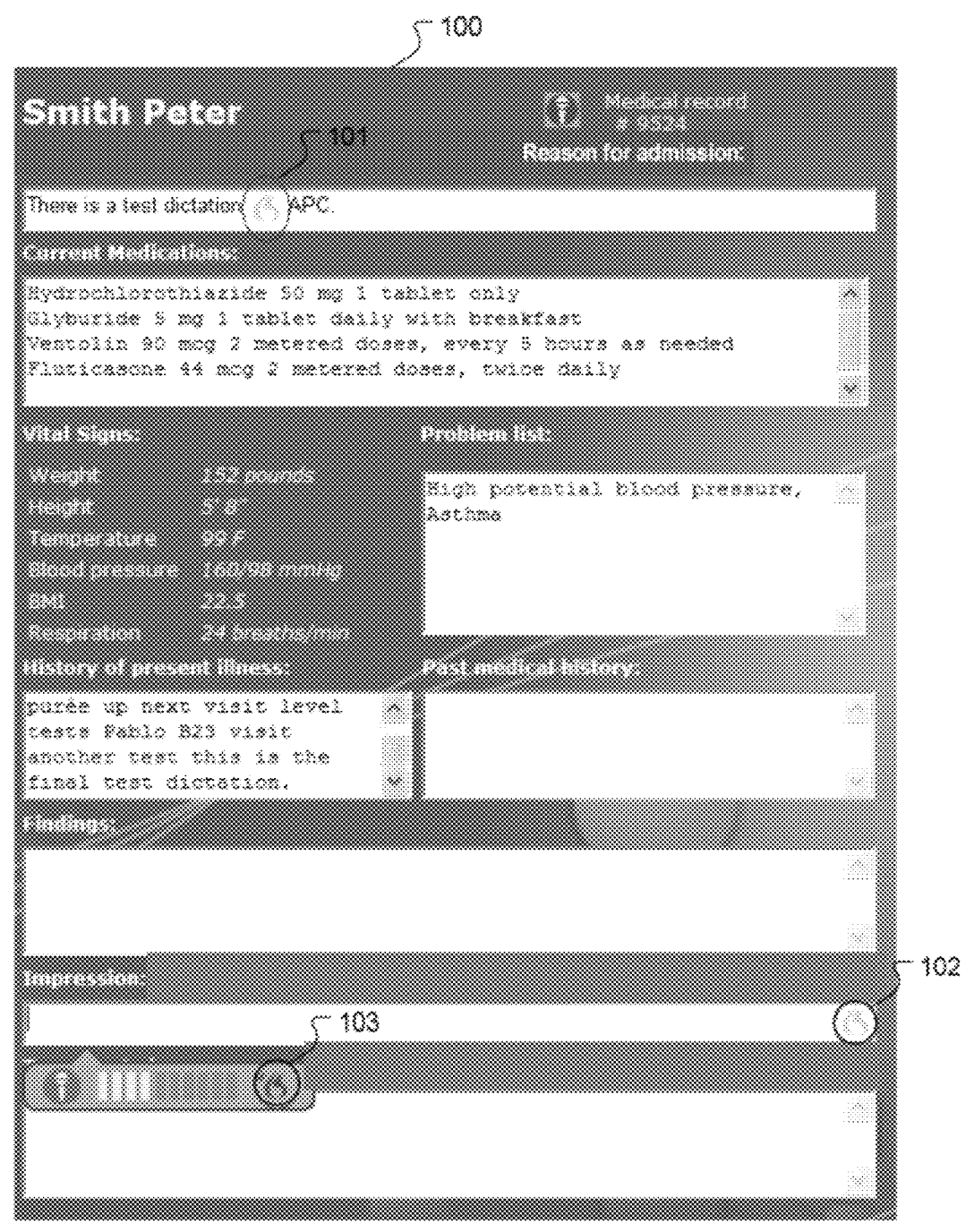

FIG. 1 shows an example of a mixed latency multi-modal graphical user interface (GUI) 100 according to one specific embodiment of the present invention. The GUI 100 shows a medical record form having multiple input fields which can be accessed and filled using different user input modalities including low delay inputs such as a keyboard, mouse, pointing device etc. which respond to user inputs without significant delay, and also a high latency speech recognition input which has a significant response latency after receiving a user input before providing a corresponding completed response.

In the GUI 100 shown in FIG. 1, the system input focus was first positioned at an initial position by one of the user input controls (keyboard, mouse, speech recognition, etc.)—in this case, a form field for "reason for admission." The user then provided an initial speech input for that initial form field position, the recognition of which required some meaningful time. Before the first input result is displayed, the user triggered a screen navigation command via the keyboard to direct the next speech input into a subsequent position in another section or field of the current document—in this case the document form field for "Impression." The user then provided a subsequent speech input for the second position of the impression field.

GUI 100 provides a distinctive interim indication pending result icon 101 at the initial position that allows the user to understand that processing of the initial speech input has started. In the embodiment shown, the GUI 100 also displays preliminary indication of the most likely recognition result for the initial speech input: "This is a test dictation," which also may be highlighted, for example, in a distinctive font or text color. In other embodiments, interim indication may be provided in other forms such as a distinctive frame, cursor, other highlighting, etc. The subsequent position impression field also has an interim indication marking in the form a pending navigation request icon 102 showing where the user clicked with the keyboard to enter a screen navigation command and showing the new input focus position where the next speech input will be inserted after the initial speech input results have been inserted into the field for the initial position. In other embodiments, interim indication of pending navigation requests may come in other specific forms (e.g., light gray cursor, frame around input field to become active, etc.) The impression field in GUI 100 also has a progress indication bar 103 indicating that speech input data is being collected and processed for the next speech input.

Keyboard typing text input at a location where there is a pending latency delayed result from an utterance that has not yet been processed by speech recognition could also be indicated, for example, by using a different font/color. Similarly, checking of a check box could be set to a distinctive interim indication color to indicate that the final result may be changed by a still pending user input—for example, the checkbox might need to be removed because delayed results cause a restructuring of the GUI. In some embodiments, a successfully posted document workflow command (such as. "send report") may trigger an audible interim indication such as a beep.

Once recognition of the initial speech input is complete, the corresponding recognized text is displayed on the GUI 100 at the initial position and the distinctive marking of the interim indication is removed for the initial position and the initial recognition result. Then later, recognition of the subsequent speech input finishes, the corresponding recognized text is displayed on the GUI at the second subsequent position and the distinctive marking of the interim indication is removed for the subsequent position and the subsequent recognition result. Once all pending high latency tasks have been processed, the system finalizes execution of the user request. Since this amount of time is a major contributor to the user's subjective experience of system responsiveness, this improves end user acceptance of the system.

One kind of feedback provided by embodiments of the present invention mitigates the effects on the end user of response latencies in the specific form of feedback on pending responses/results. For example, pending speech recognition results may be visualized by an indication that the speech recognition engine is currently processing results, by highlighting the GUI elements such as form fields and other text boxes where completed results still remain to be inserted, and/or by inserting an icon at the location where the pending results will be inserted. Pending responses/results from long-running tasks can be visualized by an indication at the control element that is used to trigger the task (such as a button or menu entry) to show that the task has been triggered and that results will be provided presently. In addition or alternatively, there may be an indication at the GUI elements to show where the results will be inserted presently.

Another type of user feedback provided by embodiments of the present invention is known as optimistic or predictive execution feedback. For user inputs that depend on pending results or that may be invalidated by pending commands, predictive execution feedback provides a prediction of the most likely future completed result and gives this as immediate feedback to the user. Conventional GUIs do not typically provide feedback on predictive execution. Some applications allow a user to start multiple long-running tasks in parallel (for example, opening several web pages in different browser tabs), but existing applications are not known that allow an arbitrary mix of delayed and immediate operations where there is user feedback indication for immediate operations that may be influenced by the result of delayed operations.

In the field of speech recognition applications there is a feature known as "recognition previews" that displays preliminary recognition results to the user to indicate that the system is running and working towards a final recognition result. But speech recognition systems are not known that combine this with previews on the effect of immediate modality inputs such as editing via keyboard.

Progress indicators are sometimes used in GUI design, but usually these are restricted to whole applications or entire windows. For example, an application that starts a long-running task will often display an hourglass or a progress bar. A web browser loading a web page typically displays some progress indicator in a status bar and will incrementally build up the page as data arrives. But applications are not known that provide fine grained progress indicators embedded into individual GUI elements as described herein, or that provide progress indicators that encompass multiple user interactions such as trigger a task—navigate in the GUI—trigger another task.

Known high level speech input frameworks—such as VoiceXML, SALT, and XHTML+Voice—do not deal with response latency at all. Rather, it is expected that the form fields are filled in a dialog-style fashion where the user has to wait for an utterance to be processed before the client continues with the dialog (the exception being the <sync> element of XHTML-Voice which allows for a certain asynchronicity, but does not specify how conflicts between voice and keyboard input should be resolved). Known low level speech APIs—such as Microsoft's SAPI, Nuance's DNS SDK and Nuance's SpeechMagic SDK—also do not deal with response latencies and provide no support for multi-modal input (with the exception of SpeechMagic SDK's "QueueNonVocalCommand", which only supports application of events synchronized with audio). Known multi-modal input standards—such as W3C "Multimodal Architecture and Interfaces" (draft) and various other systems based on so-called "late fusion"—also do not deal with response latency issues and instead assume that all input events are processed in time order.

Known MVC-based GUI frameworks do not explicitly deal with response latencies between view/controller and model; rather they are usually designed in such a way that model updates are expected to result in an immediate, synchronous view update and actions on the controller result in an immediate, synchronous model update. For example, Microsoft Foundation Classes Document-View architecture employs a synchronous method, CDocument::UpdateAllViews, to update views after the model (=CDocument) has changed. Java Swing does not provide any specific mechanism for merging view updates with asynchronous changes to the model. And web-based MVC frameworks such as ASP-.NET MVC and J2EE assume that all client requests (=changes on the view) are executed synchronously—the user has to wait until the result page is displayed in the browser.

FIG. 2 shows various functional blocks in a multi-modal GUI system 200 according to an embodiment of the present invention which supports various mixed latency input modalities. Here the user 201 can employ one or more low delay inputs 202 such as a keyboard, mouse, pointing device etc. which correspond to input events that respond without significant delay. The user 201 also has available one or more a high latency inputs 203 such as a speech recognition input which has a significant response latency after receiving a user input before providing a corresponding completed response. The user inputs control a system GUI 204 with multiple various control elements 205 such as menus, buttons, input fields, etc. that can be activated by any of the input modalities. Any of these control elements 205 also may trigger a high latency task 206 such as data base access or access to web services that will produce results in a delayed fashion. Any of the input modalities or task results also may require additional data present in the GUI or may modify the GUI in such a manner that GUI elements 205 may be added, removed, or modified.

For example, when the user interacts with a high latency input 203 such as a speech recognition input, the audio is processed by the GUI system 200 and only when the recognition process is at least partially computed can results be applied to GUI 204 where they become visible to the user. When the user enters text via a high latency input 203 such as a speech recognition input which does not immediately appear in the GUI 204, and then immediately changes the GUI 204 via a low delay input 202 (for example, by clicking into a different form field or editing text in a document via keyboard), then the delayed text result from the original speech input to the high latency input 203 should be inserted at the location where the cursor was when the user originally dictated it, not at the current cursor location. Similarly, when the user speaks a voice command such as "next field," the command processing via the high latency input 203 is delayed by response latency, so if the user decides to change the cursor location immediately via a low delay input 202 (for example, by touching a field), then a delayed arrival of the "next field" result should not cause the cursor to move, because this command has been overridden by the previous user action. The user should be allowed to issue an input event via a high latency input 203 and immediately afterwards, without waiting for the delayed result enter another input event via a low delay input 202. Typically the operating system manages interactions between the GUI 204 and the low delay input 202, and between the GUI 204 and the user 201.

Figure 3:
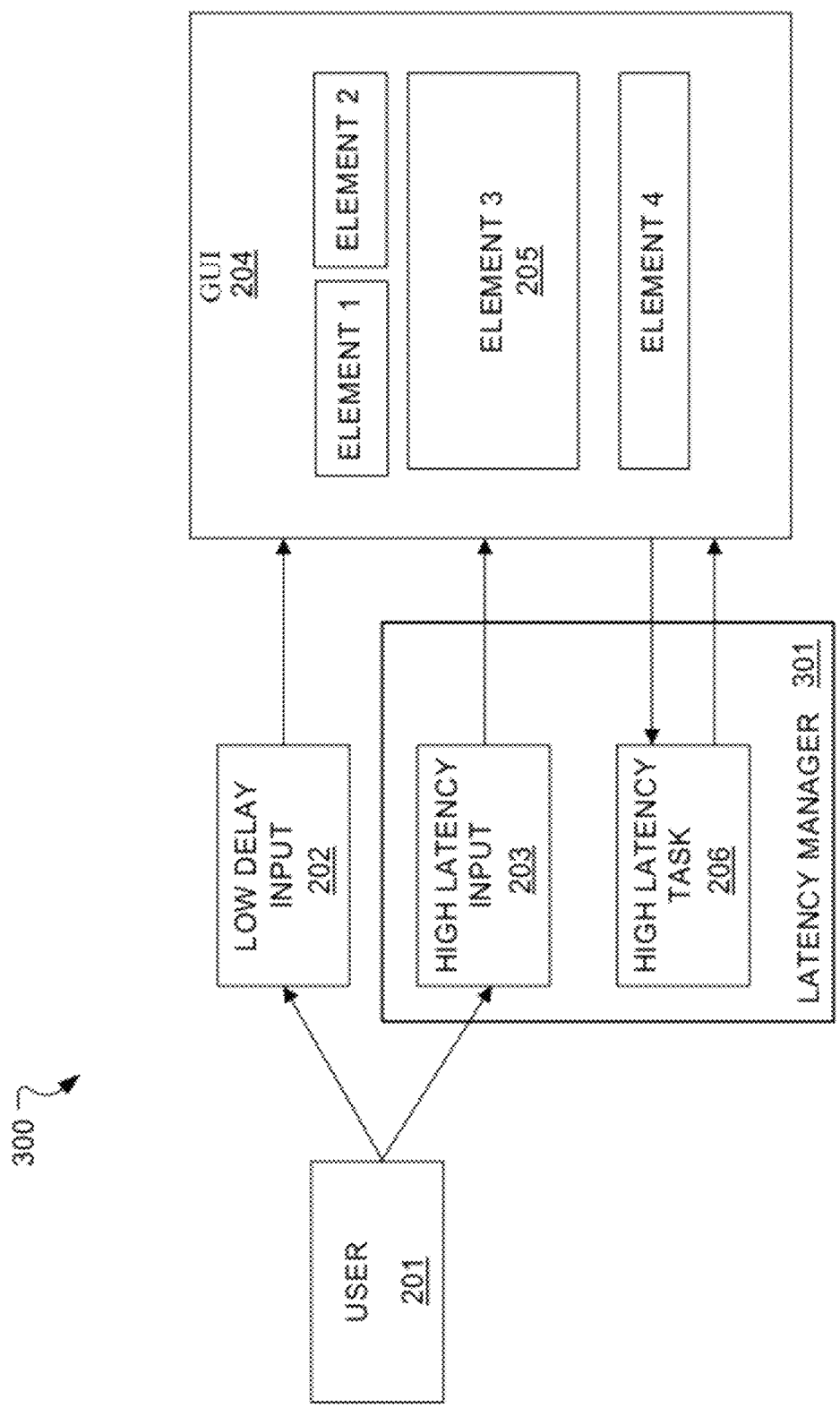
FIG. 3 shows various functional blocks in a multi-modal GUI system using a latency controller arrangement.

FIG. 3 shows various functional blocks in a multi-modal GUI system 300 using a latency manager 301 which manages the interactions between the user 201 and the high latency input 203, and also between the GUI 204 and the high latency input 203 and high latency task 206. It is the latency manager 301 that is responsible for applying delayed results to the GUI 204 so that its end state is equivalent to the state that would have been achieved if there had been no out of order inputs. And while FIG. 3 shows the latency manager 301 as containing the one or more high latency inputs 203 and one or more high latency tasks 206, that is not a particular requirement; for example, in other embodiments the latency manager 301 may be separate from and interposed between the GUI 204 and the high latency inputs 203 and/or the high latency tasks 206.

Figure 4:
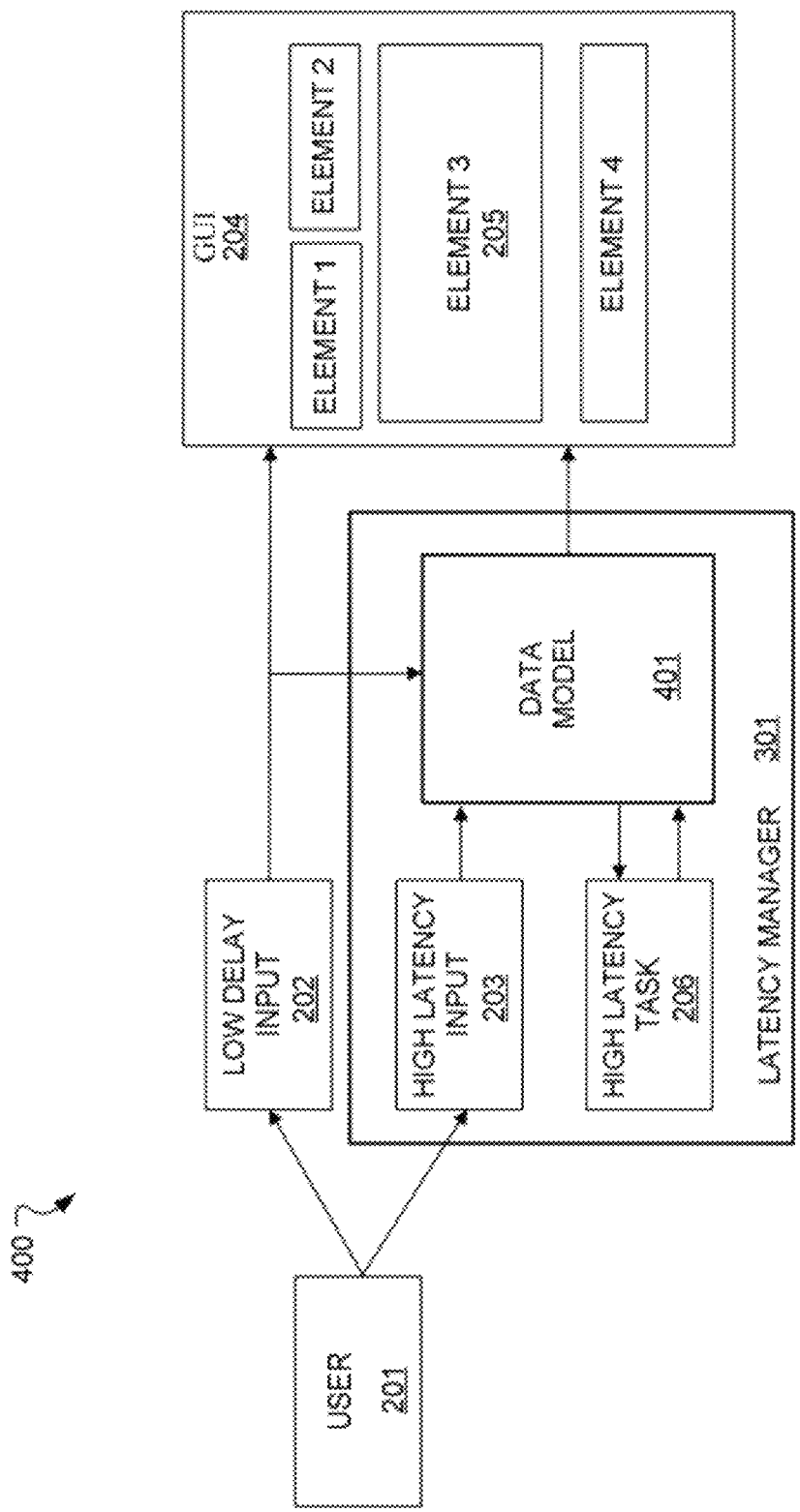
FIG. 4 shows various functional blocks in a multi-modal GUI system using a data model arrangement.

FIG. 4 shows various functional blocks in a multi-modal GUI system 400 using a data model 401 arrangement for handling the specific case of server-based speech recognition. The data model 401 is "close" to the high latency input 203 (i.e. the speech recognizer) so that there is no significant response latency in the communication between the two. The data model 401 receives all user inputs from both the high latency input 203 and low delay input 202 to minimize latency effects due to network communications. Based on the state of the data model 401, the latency manager 301 manages all the system interactions as described above. And again, While FIG. 4 shows the latency manager 301 as containing the data model 401, the one or more high latency inputs 203, and the one or more high latency tasks 206, that is not a particular requirement; for example, in other embodiments the latency manager 301 and/or the data model 401 may be separate from each other, and/or interposed between the GUI 204 and the high latency inputs 203 and/or the high latency tasks 206. Note that in the arrangement shown in FIG. 3, a data model may be implicitly or explicitly implemented within the GUI 204.

The execution flow in such systems may be such that when the user interacts with the system, all activities (editing, speech recognition of individual utterances, touch or mouse click events) are put into a single, combined event queue within the latency manager 301 in the order that the user executes them. Events that may suffer from response latency (e.g., speech recognition and other server-based activities) are enhanced by the latency manager 301 with sufficient context to allow later merging of results. Events that do not suffer from response latency (editing, touch, mouse click) are immediately applied by the latency manager 301 to the GUI 204 (typically, either automatically by the operating system and/or GUI framework). Events are applied to the data model

401 only in time order. This may cause the view presented by the GUI 204 and the data model 401 to get out of sync from each other.

To process events that suffer from response latency in a server-based speech recognition embodiment, when delayed results arrive from the high latency input 203 they are first applied to the data model 401. Since events are only applied to the data model 401 in time order, the event can be applied to the current model state without special processing. For server-based speech recognition, after the event has been applied to the data model 401, it can be forwarded to the GUI 204 enhanced with sufficient model context to allow merging with the current view. In both server-based and client-based speech recognition, the view of the GUI 204 may be out of sync with the data model 401 due to immediately-applied events, so the event may need to be merged with the current view state.

To process events that are executed immediately, the event is first applied to the view of the GUI 204. The view state before event application and information about which events have already been applied to the view and which are still pending is stored. For server-based speech recognition, the event may be forwarded to the data model 401 enhanced with the information stored in the previous step. As noted in the previous paragraph, events are not applied to the data model 401 immediately but rather in time order. Therefore, when the event is applied to the data model 401 the model state may differ from the view state against which the event has been applied because in the meantime one or more pending latency-encumbered events may have been applied to the data model 401 such that the event needs to be merged with the current model state.

In a specific client-server speech recognition application, the response latencies should be hidden as much as possible so that the user does not need to wait for a result. For example, the current event focus may be in some text box 1 when the user dictates "boo," taps text box 2 without waiting for first result to be inserted, and dictates "bar." After some time, "boo" is inserted in text box 1 and "bar" is inserted in text box 2. Or if the current input focus is in text box 1, the user dictates "boo," dictates "next field" without waiting for result to be inserted, and then dictates "bar," after some time, "boo" is inserted in text box 1 and "bar" is inserted in text box 2. There should be no unpleasant surprises for the user. System behavior should be deterministic even in the presence of response latency, and optimally the final text should be independent of response latency. Determinism also should be based on simple rules, and optimally a multi-modal input sequence—mixing utterances and manual GUI changes—should lead to the same result as an equivalent uni-modal sequence. There also should be an immediate transition from idle to recording, so that the user can press a "record" button and start talking immediately, no audio will ever be lost and the user does not need to wait for the system to give feedback that recording is on. Technical frame conditions should also be considered such as to minimize battery usage and hide potentially high network latency from the user.

Taking a general run time view of dictation in a specific embodiment, before a new utterance is started, all GUI changes since the last utterance may be sent to the server and enqueued. When an utterance starts, it also is enqueued so that the application data set can be updated with manual edits and recognition results in the proper order (the user-perceived sequence). For recognition to start the textual context from the time when the utterance was started is needed, therefore, all changes up to the start of the utterance should be applied to the application data set first. A GUI change at the head of the queue can be applied immediately to the application data set.

A recognition-triggered change should block processing until the recognition result is available. GUI changes do not need to be returned to the client—they have already been applied to the GUI. Recognition results may be forwarded to the client where they can be applied to the GUI. In cases where the GUI and the application data set may get out of sync (for example, when the user modifies text without waiting for pending utterances to be processed) any pending recognitions may need to be aborted and a synchronization may need to be forced.

Considering the specific situation of field navigation by speech input, the user may synchronize with the recognition process. In this scenario, all changes (triggered by the recognizer) can be applied first to the application data set on the server and then to the GUI on the client. Note that GUI changes may only need to be sent to the server if they were triggered by a user action—GUI changes due to recognition results have already been applied to the data model as explained above. Furthermore, they only need to be sent at the beginning of an utterance to ensure that the recognizer has up to date textual context information.

In another case of field navigation by voice, the user may not wait for recognition to complete, a maximal latency scenario. Then all changes (triggered by the recognizer) can be applied first to the application data set on the server and then to the GUI on the client (i.e. it is not different in this respect to the fully synchronous variant). Here the effect of response latency on the server only causes the GUI updates to occur later in time. Both update events and audio are queued on the server for subsequent processing. This buffering would allow the user to continue dictation without waiting for intermediate results.

In the case of field navigation by touch input where the user does not wait for recognition to complete, again there may be maximal latency delay. So for example, some event #3 such as a click in text box B may be applied to a GUI in some state #1 before the result from a previous recognition event #2 ("utterance A") is applied. This would create a situation of two merge operations, where recognition event #2 needs to be merged on the client into a GUI that has events #1 and #3 applied, and also GUI event #3 needs to be merged on the server into an application data set that has events #1 and #2 applied to it. In this example, both merges may be trivial because the changes caused by the events are well separated, but non-trivial merges would be necessary if text in a single text box were modified by unsynchronized dictation and editing events (e.g. select, overdictate, then edit the words covered by the selection before the result from the overdictation is applied to the text).

It also may be useful in a specific client-server speech recognition application to define a simple language for modelling the effect of response latency delays on the final client side text. It can be assumed that the delay will be mainly caused by the time for recognition processing of input speech utterances which will be greater than the time of communication latency. This assumption allows that both server and client might evaluate delay at a given point in time, since the delay is known also on server side. If this assumption is not valid, communication latency may be modeled in an extended way.

For performing a non-speech activity, the positive number of pending utterances can be shown in superscript. If there is no delay, no superscript is necessary. Non-speech activities (e.g., UI click) are assumed to have no delay. Since the order of utterances or the order of non-speech activities cannot be changed, the delay superscript often has relevance only if pending utterances are followed by non-speech activities. It may also be assumed that the application has form fields that can be indexed by field identifier subscripts.

An input utterance may be either dictation or field navigation. Dictation can include any utterance that changes the text context such as text insertion ("normal" dictation), text deletion (e.g. "scratch that"), and text selection (e.g. "select previous sentence"). Field navigation refers to a focus change to the specified field. If the field is a text box, the insertion point is implicitly placed at the end of the field. If the field is a special element such as a button, the "navigation" implies activating the element, resulting e.g. in a "button click". Any general (non-editing-related) voice command can be regarded as field navigation to a virtual button. So, for example, for a given input utterance, U, dictation into a field i is represented as $D_i$, and navigation into a field j is represented as $F_j$. Relative navigation (e.g. Next (Previous) Field ($F_{i+}$ or $F_{i-}$)) can be treated as a special variant of field navigation. For dictation, the subscript denotes the field that has the focus at the start of the utterance. For field navigation, the subscript denotes the field that is (will be) the target of the navigation.

Non-speech events also occur such as GUI update when starting a new utterance, abort, user click or type. Notation for a non-speech event NS can refer to starting in field i: $ST_i$, abort: AB, click into field j: $C_j$, editing in field i: $E_i$. Editing implies a "click into field" (focus change) and covers the activities such as typing (=adding, changing, or deleting characters—ET) and changing the selection (=positioning the cursor at a specific text position or selecting several characters—ES).

During recognition, R, the client user is either speaking U(tterance), clicking C(lick), or editing E(dit). Navigation is either field navigation or click into a field, $N_i$: $F_i|C_i$. A recognition session, RS, is a sequence of recognition events after starting a GUI update, which ends when all pending utterances have been applied to the client GUI or at an abort event: RS: ST R*[AB]. Apart from the start event ST, GUI updates need to be sent at the start of any utterance that was preceded by a C or E event.

Client activities can be modelled as recognition session sentences, and client results modelled by rewriting the activities via rules. This may usefully be illustrated with a number of examples for recognition session sentences and expected results. Note that these examples are only interesting in the presence of response latency. If there is no latency, the sequence of events in the recognition session exactly corresponds to the expected result.

For example, consider the case where a user dictates into a form field A, and then activates (click) another form field B and dictates further. The expected operation should be that first utterance results are placed into field A and the second utterance into field B; i.e. text is always inserted at the place where the cursor was when the utterance was started. To realize this, the client sends the cursor surroundings and focussed field at the start of an utterance, and the server sends target field and position with each text result back to the client for insertion into a given field at given position. Thus:

Recognition session: $ST_a D_a^1 C_b^1 D_b^2$
Result: $ST_a D_a C_b D_b$

Note that the first utterance is expected to go into field A even though it will arrive at the client only after the click into field B as indicated by the latency delay superscript "1" in symbol "$C_b^1$".

Also consider the case where a client user dictates into a form field A, utters a navigation command and then dictates further. Here the expected operation is as in the previous case. To realize this in an optimal way minimizing client-server communications, the remote server needs to know the structure of the document (client sends surroundings with each utterance) so that the server can immediately apply the navigation command to the data model, then there will be no blocking of recognition and the utterance in field B is evaluated with field B surroundings. If the server does not know the structure of the document, then there will be blocking of recognition until the client sends the new surroundings in field B. Thus:

Recognition session: $ST_a D_a^1 F_b^2 D_a^3$
Result: $ST_a D_a F_b D_b$

Note that the expected result is just as it would be if there were no response latency.

For a similar case with field navigation by touch, the same result as in the previous example is expected. That is response latency should not matter even if multi-modal input is used, and the text of the first utterance should go into the first field even though the result arrives at the client only after the click into the second field.

Recognition session: $ST_a D_a^1 C_b^1 D_b^2$
Result: $ST_a D_a C_b D_b$

Another case would be when the user clicks a text box A, speaks "utterance A," clicks text box B, speaks "next field," and speaks utterance C:

Recognition session: $ST_a D_a^1 C_b^1 F_{b+}^2 D_b^3$
Result: $ST_a D_a F_c D_c$ Note that the click followed by navigation is collapsed into just a single focus change.

Or a user could click a text box A, speak some "utterance A," speak "next field," click text box C, and speak utterance C:

Recognition session: $ST_a D_a^1 F_{a+}^2 C_c^2 D_c^3$
Result: $ST_a D_a C_c D_c$ Note that the navigation followed by a click is collapsed into just a single click.

In the case of abort rules, an abort releases any following pending utterances:

A. (R1, . . . , Rk) $AB^m \rightarrow$ [Er, . . . , Es] [Ct]//where Er, . . . , Es are all edits and Ct is the last click in {R1 . . . Rk}

Thus, an abort does not undo any edits or clicks, it only clears all pending utterances.

Navigation rules can also be useful, for example, a sequence of (absolute or relative) navigation events is equivalent to the last event. So a combination of navigation commands becomes:

$N_a^k N_b^{k(+1)} \rightarrow N_b$

And dictation goes into the field that is focused by most recent navigation event, even if the dictation was uttered in a different field. So the navigation becomes:

$N_b^{k(-1)} N_a^k D_b^{k+1} \rightarrow N_b N_a D_a$.

Some additional examples of navigation rules include:

Click is applied in the original order: $D_a^k C_b^k D_b^{k+1} \rightarrow D_a C_b D_b$ Navigation is applied in the original order: $D_a^k F_b^{k+1} D_a^{k+2} \rightarrow D_a F_b D_b$ Last absolute navigation is applied: $D_a^k C_b^k F_c^{k+1} D_b^{k+2} \rightarrow D_a F_c D_c$ Last absolute navigation is applied: $D_a F_i C_b^k D_b \rightarrow D_a C_b D_b$ Navigation is relative to position at start of utterance: $D_a^k C_b^k F_{b+}^{k+1} D_b^{k+2} \rightarrow D_a F_{b+} D_{b+}$ The examples may be less trivial than expected since the rules preserve the order of the multi-modal event sequence. If the client GUI order would take precedence, undesired behaviour could result such as the click being applied before delayed dictation results:

$D_a^k C_b^k D_b^{k+1} \rightarrow C_b D_b D_b$

Editing rules can also be implemented. Editing events come at different levels of complexity. For example, editing may occur in text boxes for which no dictations are pending. That should not be a problem since the client can apply the dictation events without restriction:

$(R_1 \ldots R_k)E_i^k \rightarrow E_i(R_1 \ldots R_k)$ with i not in 1 ... k. But note that the client cannot determine the condition "i not in 1 ... k" a-priori since some of the recognition events may be navigation. But the client can determine whether a field was edited when the result for a certain field arrives.

Or editing may occur at a character position that is greater than the character position(s) touched by the pending dictations:

$(R_1 \ldots R_k)E_i^k \rightarrow E_i(R_1 \ldots R_k)$ with i in 1 ... k so that the edit position is greater than the position touched by $R_i$. For the application of dictation events after typing there should not be any particular problem, the client can apply the dictation events without restriction by making sure that the selection is not moved by the text updates to avoid disturbing the user's editing. Starting a new dictation after a selection has changed is still possible, but the selection cannot be communicated as an absolute position, that will change as the pending dictation is applied at a smaller character position.

Editing may occur at a character position that is smaller than the character position(s) touched by the pending dictations:

$(R_1 \ldots R_k)E_i^k \rightarrow E_i(R_1 \ldots R_k)$ with i in 1 ... k and the edit position less than the position touched by Application of dictation events after typing is allowed, but the dictation events cannot be applied at an absolute position, that will change if the editing changes the # of characters in the field. Starting a new dictation after selection changed is not a problem because the absolute position and character surroundings for the new dictation will not change as pending dictation events are applied.

Editing also may occur at a character position that overlaps with the character position(s) touched by the pending dictations. For such circumstances, there does not appear to be an obvious solution, the user's intentions cannot be determined and even the user may not even have considered what should happen. One possible approach would be to place the result at some given position in the field such as the current location of the insertion point or a canonical end of field insertion position. In this way neither editing nor dictation are lost, but the client must communicate the change to the server and the problem is compounded, especially if multiple utterances are pending. In addition, the text formatting may not match the cursor surroundings. Alternatively, the system could undo the editing and replace the contents of the field with the server's view. This would not lose the dictation and immediately brings the client and the server back in sync, but the editing is lost and the server must always provide the full text of the field, otherwise synchronicity cannot be recreated. Another possible solution to this problem would be to undo the dictation and not insert the dictation result at all in the field. This way, the editing is not lost, but the dictation is, so changes must be communicated to the server, compounding the problem, especially if multiple utterances are pending.

For communication response latencies where there is a delay caused by slow communication, the modelling on the client and the modelling on server should not be the same, so that the recognition session sentences are different on the client and on the server. Client actions would change the delay subscript when seen from the perspective of the server. For example, if client server communication is slow, sending client events to the server might have delays:

$ST_aD_aC_b^1D_b^2$

Moreover, some problems can be detected only on the client, so that the client should be the only master.

Embodiments of the invention may be implemented in whole or in part in any conventional computer programming language. For example, preferred embodiments may be implemented in a procedural programming language (e.g., "C") or an object oriented programming language (e.g., "C++", "C#"). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed:

1. A computer system for displaying a multi-modal user interface comprising:
    a display; and
    a processor configured to display on the display a graphical user interface (GUI) supporting a plurality of different user input modalities including:
    i. one or more low delay input modalities, each of which responds to a low delay user input with a low delay, and
    ii. one or more high latency input modalities, each of which has a high response latency after receiving a high latency user input before providing a completed response to the high latency user input;

wherein the computer system is configured to:
accept, via the GUI, low delay and high latency user inputs in a sequence of mixed input modalities independently of response latencies without waiting for responses to high latency inputs as if each preceding user input in the sequence had been performed without response latencies;
after receiving a first high latency user input followed by a subsequent low delay user input in the sequence of mixed input modalities, alter an appearance of a display corresponding to the low delay user input to indicate a possible change in a final result for the subsequent low delay user input pending a response from the first high latency user input; and
accept user input for a second high latency input modality prior to providing a completed response to the first high latency user input.

2. A computer system according to claim 1, wherein the one or more high latency input modalities include an automatic speech recognition input modality having a response latency reflecting speech recognition processing.

3. A computer system according to claim 1, wherein the one or more high latency input modalities include delays associated with a remote server having a transfer response latency reflecting data transfer delays occurring over a computer network.

4. A computer system according to claim 3, wherein a merge process provides completed responses to the GUI after the transfer response latency according to deterministic rules.

5. A computer system according to claim 3, wherein operation of the GUI includes use of a data model process for managing the sequence of user inputs.

6. A computer system according to claim 5, wherein the data model process runs on a remote server.

7. A computer system according to claim 5, wherein the data model process performs user inputs in the sequence in a correct time sequence order.

8. A method of operating multi-modal user interface comprising:
providing a graphical user interface (GUI) supporting a plurality of different user input modalities including:
i. one or more low delay input modalities, each of which responds to a low delay user input with a low delay, and
ii. one or more high latency input modalities, each of which has a high response latency after receiving a high latency user input before providing a completed response to the high latency user input;
accepting low delay and high latency user inputs to GUI elements in a sequence of mixed input modalities independently of response latencies without waiting for responses to high latency inputs as if each preceding user input in the sequence had been performed without response latencies;
after receiving a first high latency user input followed by a subsequent low delay user input in the sequence of mixed input modalities, altering an appearance of a GUI element corresponding to the low delay user input to indicate a possible change in a final result for the subsequent low delay user input pending a response from the first high latency user input;
and
accepting user input for a second high latency input modality in the sequence prior to providing a completed response to the first high latency user input.

9. A method according to claim 8, wherein the one or more high latency input modalities include an automatic speech recognition input having a response latency reflecting speech recognition processing.

10. A method according to claim 8, wherein the one or more high latency input modalities include delays associated with a remote server having a transfer response latency reflecting data transfer delays occurring over a computer network.

11. A method according to claim 10, wherein a merge process provides completed responses to the GUI after the transfer response latency according to deterministic rules.

12. A method according to claim 10, wherein operation of the GUI includes use of a data model process for managing the sequence of user inputs.

13. A method according to claim 12, wherein the data model process runs on a remote server.

14. A method according to claim 12, wherein the data model process performs user inputs in the sequence in a correct time sequence order.

15. A non-transitory data-storage device encoded with instructions that, when executed by at least one computing device, adapt the at least one computing device to execute acts of:
providing a graphical user interface (GUI) supporting a plurality of different user input modalities including:
i. one or more low delay input modalities, each of which responds to a low delay user input with a low delay, and
ii. one or more high latency input modalities, each of which has a high response latency after receiving a high latency user input before providing a completed response to the high latency user input;
accepting low delay and high latency user inputs to GUI elements in a sequence of mixed input modalities independently of response latencies without waiting for responses to high latency inputs as if each preceding user input in the sequence had been performed without response latencies;
after receiving a first high latency user input followed by a subsequent low delay user input in the sequence of mixed input modalities, altering an appearance of a GUI element corresponding to the low delay user input to indicate a possible change in a final result for the subsequent low delay user input pending a response from the first high latency user input;
and
accepting user input for a second high latency input modality in the sequence prior to providing a completed response to the first high latency user input.

16. The non-transitory data-storage device of claim 15, wherein the one or more high latency input modalities include an automatic speech recognition input having a response latency reflecting speech recognition processing.

17. The non-transitory data-storage device of claim 15, wherein operation of the GUI includes use of a data model process for managing the sequence of user inputs.

18. The non-transitory data-storage device of claim 17, wherein the instructions include a merge process that provides completed responses to the GUI after a transfer response latency according to deterministic rules, wherein the transfer response latency is associated with data transfer delays over a computer network.

* * * * *